(12) United States Patent
Yeo et al.

(10) Patent No.: US 8,647,557 B2
(45) Date of Patent: Feb. 11, 2014

(54) METHOD FOR PRODUCING SHEETS INCLUDING FIBROUS AEROGEL

(75) Inventors: Jeong-Gu Yeo, Daejeon (KR); Eunju Lee, Daejeon (KR); Churl-Hee Cho, Daejeon (KR); Hyun-seol Park, Daejeon (KR); Nam-jo Jeong, Daejeon (KR); Chang-Kook Hong, Gwangju (KR); Dong-kook Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 225 days.

(21) Appl. No.: 13/252,552

(22) Filed: Oct. 4, 2011

(65) Prior Publication Data
US 2012/0171488 A1    Jul. 5, 2012

(30) Foreign Application Priority Data

Dec. 30, 2010 (KR) ........................ 10-2010-0138795

(51) Int. Cl.
| | | |
|---|---|---|
| *B29C 71/02* | (2006.01) | |
| *C01B 33/157* | (2006.01) | |
| *D06C 7/00* | (2006.01) | |
| *D06M 10/00* | (2006.01) | |
| *H05B 6/00* | (2006.01) | |

(52) U.S. Cl.
USPC ......... 264/465; 264/211.2; 264/234; 423/338

(58) Field of Classification Search
USPC ............... 264/211.15, 211.17, 211.18, 211.2, 264/234, 464, 465, 466, 484; 423/338
See application file for complete search history.

(56) References Cited

U.S. PATENT DOCUMENTS

| | | | | |
|---|---|---|---|---|
| 2008/0199698 A1* | 8/2008 | Kohinata et al. | .......... | 264/465 X |
| 2009/0166577 A1* | 7/2009 | Peng et al. | ................ | 264/465 X |
| 2010/0080993 A1* | 4/2010 | Privitera et al. | ........... | 264/464 X |
| 2010/0255745 A1* | 10/2010 | Liles et al. | ................ | 264/465 X |

FOREIGN PATENT DOCUMENTS

| | | |
|---|---|---|
| KR | 1019990044558 | 6/1999 |
| KR | 1020040030462 A | 4/2004 |
| KR | 100739346 B1 | 7/2007 |
| KR | 1020070100738 A | 10/2007 |
| KR | 1020100010350 | 2/2010 |
| WO | WO-2010143902 A2 * | 12/2010 |

OTHER PUBLICATIONS

Kim, Ji Hye, "A study on the composite nanofibers for the applications of energy conversion systems and biomedical carriers", Feb. 2002, pp. 1-120.

Yeo, Jeong-Gu et al., "Silica-Polymer Complex Fiberweb Prepared from Polymeric Precursor Solution", Oct. 22, 2010, pp. II-47.

Yeo, Jeong-Gu et al., "Fabrication of silica composite paper by polymer electrospinning", Oct. 8, 2010, 2PS-235.

Liwen Ji, Xiangwu Zhang, "Ultrafine polyacrylonitrile/silica composite fibers via electrospinning", 2008, pp. 2161-2164, vol. 62, ScienceDirect.

\* cited by examiner

*Primary Examiner* — Leo B Tentoni
(74) *Attorney, Agent, or Firm* — Brian R. Morrison; Westman, Champlin & Koehler, P.A.

(57) ABSTRACT

Disclosed herein is a method for producing a sheet including a silica aerogel, the method including (S1) gelling a water glass solution in a mixture of an alcohol and water to prepare a wet gel, (S2) hydrophobically modifying the surface of the wet gel with a non-polar organic solvent, an organosilane compound and an alcohol, (S3) dissolving the hydrophobically modified silica gel and a polymer in an aprotic organic solvent to prepare an electrospinning solution, and (S4) electrospinning the electrospinning solution to produce a fiber web including a silica aerogel, and a sheet in which a polymer and a silica aerogel coexist in the form of a fiber.

14 Claims, 6 Drawing Sheets

METHOD FOR PRODUCING SHEETS INCLUDING FIBROUS AEROGEL

CROSS-REFERENCE TO RELATED APPLICATION(S)

This application claims priority to and the benefit of Korean Patent Application No. 10-2010-0138795, filed with the Korean Intellectual Property Office on Dec. 30, 2010, the disclosure of which is incorporated herein by reference in its entirety.

FIELD OF THE INVENTION

The present invention relates to sheets including a silica aerogel and a method for producing the same. More particularly, the present invention relates to sheets including a fibrous silica aerogel produced via electrospinning.

DESCRIPTION OF THE RELATED ART

Aerogels are porous materials that have a high porosity of a maximum of about 99%, compared to currently known solids. Aerogels are very light in weight and are excellent in soundproof performance as well as thermal insulation performance due to their porous structure. Fire resistance of inorganic aerogels makes them most useful as thermal insulation materials. A survey of patent application trends conducted by the Korean Intellectual Patent Office (KIPO) revealed that a technology for producing high-performance aerogels in an economical manner is the obstacle to successful commercialization. A silica aerogel, a representative form of inorganic aerogel, is obtained by sol-gel condensation of a silica precursor solution to form a gel and drying the gel under supercritical conditions or at ambient pressure. The obtained silica aerogel has a porous structure filled with air. Aerogels tend to be brittle due to their very highly porous structure, as described above. Aerogels are practically used in the form of structurally stable products. For example, aerogels are placed in particularly designed containers (e.g., skylights) or are prepared in the form of composites (e.g, mats) with fibrous matrixes.

According to a conventional technique for producing a silica aerogel-containing mat, a silica precursor solution is impregnated into a matrix composed of an aluminosilicate-glass filament, a polyacrylonitrile fiber, a carbon fiber, a polyester fiber, a bicomponent fiber or a combination thereof. The silica aerogel-containing mat produced by the technique is a composite in which a silica aerogel is bound to the fiber. Two methods are known for producing silica aerogel-containing composites. The first method is to impregnate a silica precursor solution into a fiber matrix (see Korean Unexamined Patent Publication No. 10-2004-0030462). The second method is to pour a solution of silica aerogel particles into a fiber matrix (see Korean Unexamined Patent Publication Nos. 10-1999-0044558 and 10-2007-0100738).

Impregnation with a silica precursor solution, solidification into a gel and subsequent hydrophobic modification tend to cause chemical damage to ceramic fiber components, weaken the binding strength between the fiber and an aerogel, and cause separation of a powder of the aerogel from a final composite after drying.

When attempting to produce a composite of aerogel particles and a fiber, the aerogel particles are pulverized to a size of 1 mm or less, for example, 30 to 500 µm and the fiber is limited to a diameter of 1 to 18 µm to ensure good mechanical stability of the composite. More desirably, the composite is constructed such that the fine aerogel particles are sufficiently suspended within a mat. However, the composite has the problem of low adhesive strength because the aerogel particles are suspended between the pores of the fiber. To solve this problem, an adhesive and/or a coupling agent are further used to prevent the aerogel particles from separating or falling apart.

Ceramic fibers that are mainly used at present as high-temperature thermal insulation materials in Korea have an average diameter of 3 µm and a thermal conductivity of 0.036 W/m·K at room temperature, which is about twice higher than that (0.018 W/m·K) of silica aerogels. Due to the higher thermal conductivity of the ceramic fibers, the thermal properties of matrix components supporting the skeleton of a composite disadvantageously deteriorate the overall thermal performance of the composite. Further, the use of a silica precursor solution or a silica aerogel powder for the production of a composite is limited in increasing the relative proportion of the silica aerogel in the composite. The low concentration (<10%) of silica in water glass as a silica precursor solution and the limitations resulting from a discontinuous batch process in a unit process of ambient or supercritical drying after gelation make it impossible to completely convert the silica into a silica aerogel. A maximum concentration of silica in commercially available blankets is known to be 40%. The limited relative proportion of the silica aerogel ultimately leads to deterioration in the thermal performance of the final product.

A blanket commercially available from Aspen Aerogels as a silica aerogel composite possesses a conductivity as low as 0.017 W/m·K, which is a level similar to that of silica aerogels. However, the low conductivity of the blanket appears to be because of complex results derived from a fiber web having a thermal conductivity of 0.030 W/m·K or less as a constituent material of the blanket, a complementary material additionally absorbing infrared rays (IR) and a coating of heat-reflecting thermal insulation components, such as aluminum.

Electrospinning is known as a technique for synthesizing nanofibers having a diameter of 1 micron or less. A successful attempt to synthesize a fiber having a diameter of 1 micron or more by the application of electrospinning to the production of silica aerogels has never been reported to date. The choice of the diameter of a fiber directly contributes to the mechanical strength of a composite and an aerogel fiber having a diameter of 1 micron or more has a very high value of utility as a product in the application to a thermal insulation material in that a fiber having a diameter of 1 µm or more is used.

Conventional techniques reported hitherto in connection with the production of composites with fibers by simple impregnation require complicated processes and are limited in improving the thermal performance of final products. Under these circumstances, research on methods for producing sheets including silica aerogels with improved thermal performance in a simple manner is actively underway. There is a particular need to develop a technique for producing fibers composed of silica aerogels.

SUMMARY OF THE INVENTION

The present invention has been made in view of the problems of the prior art, and it is an object of the present invention to provide a method for producing a high-performance sheet including a fibrous silica aerogel by electrospinning in which water glass is used as a raw material instead of an expensive raw material and ambient drying is used instead of supercritical drying.

It is another object of the present invention to provide a sheet with improved thermal performance and mechanical strength and excellent adsorptivity and reactivity in which a polymer and a silica aerogel coexist in the form of a fiber.

According to an aspect of the present invention, there is provided a method for producing a sheet including a silica aerogel, the method including (S1) gelling a water glass solution in a mixture of an alcohol and water to prepare a wet gel, (S2) hydrophobically modifying the surface of the wet gel with a non-polar organic solvent, an organosilane compound and an alcohol, (S3) dissolving the hydrophobically modified silica gel and a polymer in an aprotic organic solvent to prepare an electrospinning solution, and (S4) electrospinning the electrospinning solution to produce a fiber web including a silica aerogel.

Preferably, an acid solution is further added to the alcohol/water mixture for the preparation of the wet gel. The acid solution preferably includes at least one acid selected from the group consisting of hydrochloric acid, sulfuric acid, nitric acid and acetic acid.

The alcohols used in steps S1 and S2 are independently selected from the group consisting of ethanol, methanol, propanol, butanol and combinations thereof.

In step S1, the alcohol and the water glass solution are preferably mixed in a volume ratio of 0.33-1:1.

The non-polar organic solvent used in step S2 is preferably a hydrocarbon solvent selected from the group consisting of hexane, heptane, xylene, toluene and cyclohexane.

The organosilane compound used in step S2 is preferably selected from the group consisting of trimethylchlorosilane, hexamethyldisilazane, methyltrimethoxysilane, trimethylethoxysilane, ethyltriethoxysilane, phenyltriethoxysilane, and mixtures thereof.

The polymer used in step S3 is preferably poly(methyl methacrylate), poly(vinylidene fluoride) or poly(acrylonitrile).

The aprotic solvent used in step S3 is preferably selected from the group consisting of N,N-dimethylformamide, N-methylpyrrolidone, dimethylacetamide, dimethyl sulfoxide and acetonitrile.

In step S3, the hydrophobically modified silica gel and the polymer are preferably mixed in a weight ratio of 30-400:100.

In step S4, the electrospinning is preferably performed at a fixed distance of 10 to 20 cm between a spinning nozzle and a current collector, a set voltage of 10 to 60 kV and a supply rate of 0.5 to 100 ml/hr.

In step S4, the sheet in the form of a fiber web may further include beads on the surface of the fiber.

Preferably, step S4 further includes drying the sheet in the form of a fiber web prepared by electrospinning at a temperature ranging from the boiling point of the solvent to 300° C. in air.

The method of the present invention may further include thermally treating the sheet at a temperature of 300 to 1,000° C. after step S4.

According to another aspect of the present invention, there is provided a sheet in which a polymer and a silica aerogel coexist in the form of a fiber. The fiber is characterized by having a diameter of 1 micron or more. The polymer is preferably poly(methyl methacrylate), poly(vinylidene fluoride) or poly(acrylonitrile). The sheet may further include beads in which a polymer and a silica aerogel coexist. The beads may be structurally attached to the surface of the fiber.

BRIEF DESCRIPTION OF THE DRAWINGS

The above and other aspects, features and advantages of the invention will become apparent from the following detailed description in conjunction with the accompanying drawings, in which.

DETAILED DESCRIPTION OF THE INVENTION

The present invention will now be described in more detail.

The present invention provides a method for producing a sheet including a fibrous silica aerogel. The method of the present invention includes (S1) gelling a water glass solution in a mixture of an alcohol and water to prepare a wet gel, (S2) hydrophobically modifying the surface of the wet gel with a non-polar organic solvent, an organosilane compound and an alcohol, (S3) dissolving the hydrophobically modified silica gel and a polymer in an aprotic organic solvent to prepare an electrospinning solution, and (S4) electrospinning the electrospinning solution to produce a a fiber web including a silica aerogel.

In step S1, a water glass solution is gelled in a mixture of an alcohol and water to prepare a wet gel. An acid solution may be further added for the preparation of the wet gel to accelerate the reaction between the water glass and the alcohol. In this case, the water glass, the acid solution and the alcohol may be added simultaneously to prepare the wet gel. Alternatively, the wet gel may be prepared by mixing the water glass with the acid solution to synthesize a silica sol and adding the alcohol thereto. The presence of silanol groups on the surface of the wet gel makes the wet gel hydrophilic.

The alcohol may be ethanol, methanol, propanol, butanol or a combination thereof. Ethanol is preferred. The acid of the acid solution may be hydrochloric acid, sulfuric acid, nitric acid or acetic acid. The acid solution is preferably a hydrochloric acid solution.

According to a prior art method, a gel is produced by adding organic materials, such as emulsifiers and dispersants, to a silica sol to control the size and dispersion of the particles, adding an acidic or basic catalyst thereto to accelerate the gelation of the silica sol, followed by hydrolysis and condensation. In contrast, according to the method of the present invention, the gel can be produced by the addition of the alcohol to a silica sol without undergoing the processes of the prior art method.

The alcohol and the water glass are preferably mixed in a volume ratio ranging from 0.33:1 to 1:1. Out of this range, gelation does not proceed or proceeds excessively slowly.

In step S2, the surface of the wet gel prepared in step S1 is hydrophobically modified with a non-polar organic solvent, an organosilane compound and an alcohol. In this step, solvent substitution is achieved simultaneously. The alcohol may be ethanol, methanol, propanol, butanol or a combination thereof, independently of the alcohol used in step S1. Propanol is preferred. The non-polar organic solvent may be any of those known in the art. The non-polar organic solvent is preferably a hydrocarbon solvent selected from the group consisting of hexane, heptane, xylene, toluene and cyclohexane. Hexane is particularly preferred. As the organosilane compound, there may be used, for example, trimethylchlorosilane (TMCS), hexamethyldisilazane (HMDS), methyltrimethoxysilane, trimethylethoxysilane, ethyltriethoxysilane or phenyltriethoxysilane.

It is preferred to mix the solvent and the organosilane compound with the wet gel in volume ratios of 1-10:1 and 0.1-4:1, respectively. If the volume of the solvent exceeds the upper limit (10:1) or the volume of the organosilane compound is below the lower limit (0.1:1), the reaction time is excessively long. Meanwhile, if the volume of the solvent is below the lower limit (1:1) or the volume of the organosilane compound exceeds the upper limit (4:1), the reaction is too fast. Due to this fast reaction, the porous structure of the wet gel shrinks, resulting in high density, or drying shrinkage takes place, resulting in the occurrence of cracks.

In step S3, the hydrophobically modified silica gel and a polymer are sequentially dissolved in an aprotic solvent to prepare an electrospinning solution. The hydrophobically modified silica gel is herein also used as the hydrophobic silica gel.

An essential requirement for the preparation of the electrospinning solution in the method of the present invention is the use of the aprotic solvent. The hydrophobic silica gel has a chemical affinity for the aprotic organic solvent because of its hydrophobically modified surface. The aprotic organic solvent cannot solvate the hydrophobic silica gel through hydrogen bonding due to the absence of an —OH or —NH bond. As the aprotic solvent, there may be used, for example, N,N-dimethylformamide, N-methylpyrrolidone, dimethylacetamide, dimethyl sulfoxide or acetonitrile. N,N-dimethylformamide is particularly preferably used as the aprotic solvent. In contrast, protic solvents solvate the hydrophobic silica gel through hydrogen bonding due to the presence of an —OH or —NH bond. Accordingly, the use of protic solvents is not preferable because of their low affinity for the hydrophobic gel.

Thus, taking into consideration the chemical affinity for the hydrophobic gel, the polymer should be selected from hydrophobic polymers, particularly those that can be dissolved in the aprotic organic solvent. Preferably, the polymer is poly(methyl methacrylate), poly(vinylidene fluoride) or poly(acrylonitrile).

In step S3, the hydrophobically modified silica gel and the polymer are preferably mixed in a weight ratio ranging from 30:1 to 400:1. Within this range, a fibrous sheet with improved thermal insulation performance can be produced. A pure polymer spinning solution free from a hydrophobic gel composed of inorganic components is highly spinnable and does not exhibit desired thermal insulation performance after spinning. As the amount of the hydrophobic gel increases, the thermal insulation performance of a final sheet increases but the spinnability of the electrospinning solution deteriorates. If the amount of the hydrophobic gel is below the lower limit (30:1), desired thermal insulation performance cannot be achieved. Meanwhile, if the amount of the hydrophobic gel exceeds the upper limit (400:1), a fiber is not formed during subsequent spinning, and as a result, a sheet cannot be produced.

According to the method of the present invention, it is preferred to simultaneously dissolve the hydrophobic silica gel and the polymer in the aprotic organic solvent. If the hydrophobic silica gel is mixed with a solution of the polymer in the aprotic organic solvent, it cannot be homogeneously mixed with the solution, making it impossible to prepare a homogeneous electrospinning solution.

In step S4, the electrospinning solution, in which the hydrophobic silica gel and the polymer are dissolved in the aprotic solvent, is electrospun to produce a fiber web including a silica aerogel.

The electrospinning can be performed using any suitable method and apparatus known to those skilled in the art. According to one embodiment of the present invention, the spinning may be performed using a spinning apparatus connected to a power supply. In the spinning apparatus, the distance between a spinning nozzle and a current collector is fixed to 10 to 20 cm, the voltage is set to 10 to 60 kV, and the electrospinning solution is supplied at a rate of 0.5 to 100 ml/hr. The electrospinning is greatly affected by the set voltage. At a voltage lower than 10 kV, the electrospinning solution is not readily spun into a fiber and many beads tend to form in the final sheet. At a voltage higher than 60 kV, short-circuiting occurs in the insulated apparatus, tending to cause a flow of current. Preferably, the spinning at a voltage of 20 to 40 kV while maintaining the distance between the spinning nozzle and the current collector at 17 to 20 cm is effective in forming a fiber. The supply rate of the electrospinning solution is associated with the production efficiency of the product. The supply rate can be properly determined within the range defined above, taking into consideration the time required to produce the sheet. For example, the supply of the electrospinning solution at a rate of a maximum of 100 ml/hr enables the production of an easy-to-handle sheet within about 2 to about 3 hr.

Step S4 may further include drying the sheet in the form of a fiber web at a temperature ranging from the boiling point of the solvent to 300° C. in air after electrospinning. The optimum drying temperature range differs depending on the kind of the polymer used. The main purpose of the drying is to stabilize the fiber. Other purposes of the drying are to convert the hydrophobic gel into a silica aerogel and to remove the solvent. According to the method of the present invention, since the drying can be performed at ambient pressure, the need for supercritical drying, which is a general process in the production of silica aerogels, can be avoided, leading to a reduction in production and installation costs.

According to one embodiment of the present invention, the method may further include thermally treating the sheet at a temperature of 300 to 1,000° C. after step S4. For example, the physical state of polyacrylonitrile (PAN) can be maintained even at a temperature of 300° C. or higher for thermal treatment. The thermal treatment of the sheet under an inert atmosphere at a temperature of 300 to 1,000° C. causes carbonization of the fiber to leave fine pores. Due to this additional thermal treatment, the characteristics of fine pores of the carbonized fiber can be further utilized and a porous body having a micro/mesoporous composite structure can be produced.

The present invention also provides a sheet in which a polymer and a silica aerogel coexist in the form of a fiber. The fiber is characterized by having a diameter of 1 micron or more. The polymer is preferably poly(methyl methacrylate), poly(vinylidene fluoride) or poly(acrylonitrile). The sheet may further include beads in which a polymer and a silica aerogel coexist. The beads are structurally attached to the surface of the fiber.

The present invention also provides a sheet including a silica aerogel in the form of a fiber. The silica aerogel fiber is characterized by having a diameter of 1 micron or more. The fiber having a diameter of 1 micron or more is larger in diameter than prior art fibers produced via electrospinning and can provide improved mechanical strength to the final sheet including the silica aerogel. The sheet may further include a silica aerogel in the form of a bead. The silica aerogel in the form of a bead is structurally attached to the fiber surface of the silica aerogel.

The following examples are provided to assist in a further understanding of the invention. However, these examples are intended for illustrative purposes only. Those skilled in the art will appreciate that various modifications and changes are possible, without departing from the spirit and scope of the invention. It is to be understood that such modifications and changes are within the scope of the appended claims.

Example 1

30 ml of a commercial water glass solution was mixed with 20 ml of ethanol, which corresponds to ⅔ of the volume of the water glass solution, and 10 ml of water, which corresponds to ⅓ of the volume of the water glass solution, to prepare a wet gel. Gelling of the mixture was observed within 10 min after mixing. The surface of silica constituting the wet gel was hydrophilic. To 10 g of the wet gel were sequentially added 10 ml of propanol, 40 ml of hexane and 20 ml of trimethylchlorosilane. The resulting mixture was subjected to surface modification and solvent substitution at room temperature for 3 hr to obtain a hydrophobic silica gel whose surface was hydrophobically modified. 2.5 g of polymethyl methacrylate (PMMA) and 1 g of the hydrophobic silica gel, which corresponds to 40% of the weight of the polymer, were added to 10 ml of N,N-dimethylformamide (DMF). After mixing for 1 day, the solution of the polymer and the hydrophobic gel was used as a electrospinning solution for making a fiber web.

The electrospinning solution was electrospun using a horizontal type electrospinning apparatus based on the principle that DC power was supplied to apply a high voltage between electrodes. In the electrospinning apparatus, the distance between a spinning nozzle and a current collector was fixed to 17.5 cm, the voltage was set to 20 kV, and the electrospinning solution was supplied at a rate of 1.0 ml/hr. As a result of the spinning under an electric field, a thin fiber web, i.e. a sheet was produced on the surface of the current collector. The sheet included a silica aerogel in the form of a spun fiber. The sheet was dried at temperatures of 100° C. and 200° C. in air for 2 hr.

Figure 1:
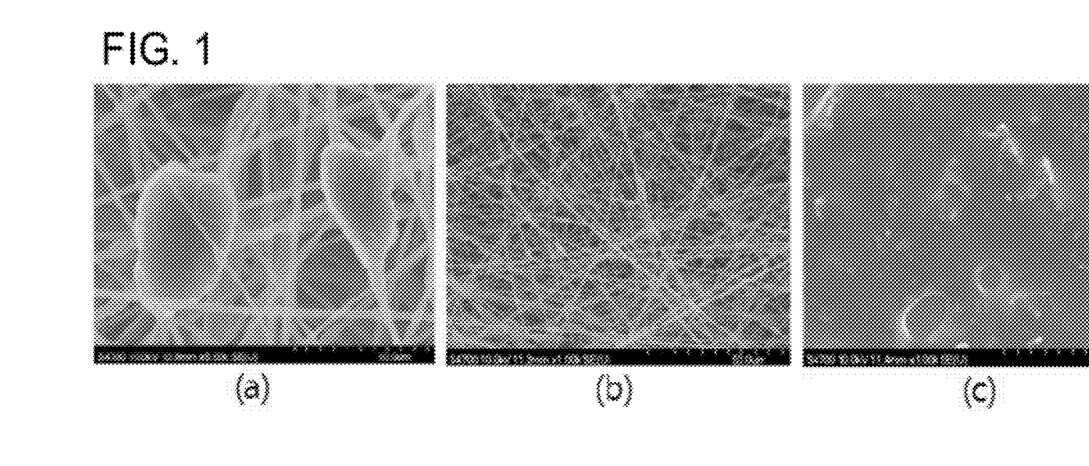
FIG. 1 shows scanning electron microscope images of a sheet produced in Example 1.

The sheet was observed under a scanning electron microscope. The images are shown in FIG. 1. After spinning (a of FIG. 1) and after drying at 100° C. (b of FIG. 1), the sheet was still in the form of a fiber. Fiber and bead forms coexisted in the sheet. After drying at 200° C. (c of FIG. 1), the polymethyl methacrylate (PMMA) disappeared, the fiber form collapsed, and grains and lumps coexisted in the sheet. The grains and lumps were derived from the silica aerogel after the hydrophobic gel was dried.

Comparative Example 1

Comparison of Characteristics of Spinning Solutions

A solution of 2.5 g of polymethyl methacrylate (PMMA) in 10 ml of N,N-dimethylformamide (DMF) was used as a spinning solution. The characteristics of the electrospinning solution were compared with those of the electrospinning solution prepared in Example 1. The electrospinning solution of Example 1 was more flowable than the electrospinning solution of Comparative Example 1. The electrospinning solution of Example 1 was colored ivory due to the presence of the hydrophobic gel, whereas the electrospinning solution of Comparative Example 1 was transparent to visible light and took a longer time to flow due to relatively high viscosity thereof. From these results, the conclusion can be drawn that the use of the electrospinning solution of Example 1 can shorten electrospinning time due to improved flowability, leading to a reduction in the overall production time of the sheet.

Example 2

A polymer solution was prepared in the same manner as in Example 1, except that polyacrylonitrile (PAN) was used instead of polymethyl methacrylate. 10 g of the hydrophobic gel and 15.1 g of polyacrylonitrile (PAN) were added to and mixed with 100 ml of N,N-dimethylformamide (DMF) for 1 day. The weight of the hydrophobic gel corresponds to 66% that of the polymer and the weight of the PAN polymer corresponds to 13% that of the polymer solution. After mixing, the solution of the polymer and the hydrophobic gel was used as a electrospinning solution for making a fiber web.

Figure 2:
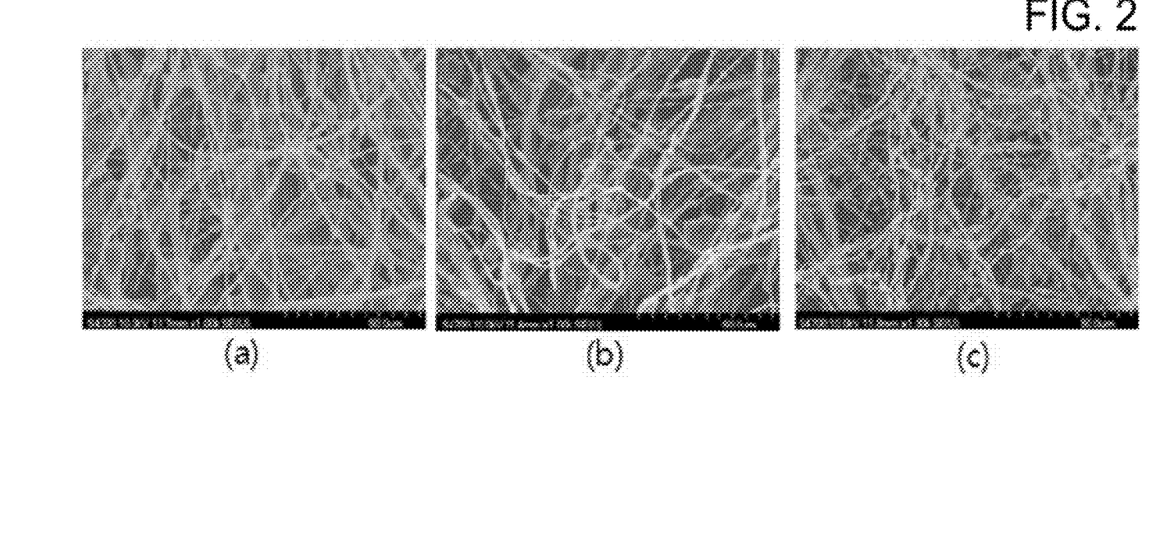
FIG. 2 shows scanning electron microscope images of a sheet produced in Example 2.
Figure 3A:
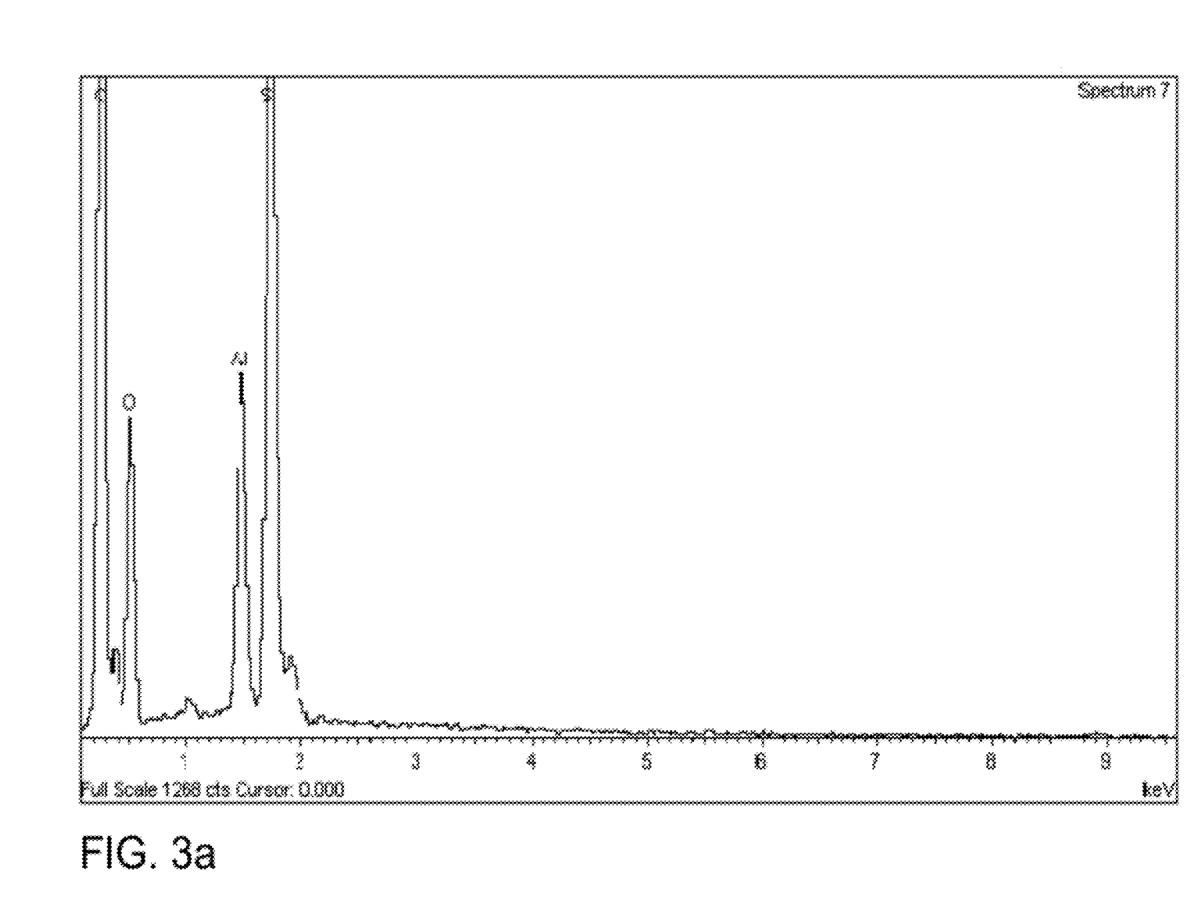
FIGS. 3a and 3b are EDAX spectra of a fiber portion and a bead portion on a micrograph of a sheet produced in Example 2, respectively.
Figure 3B:
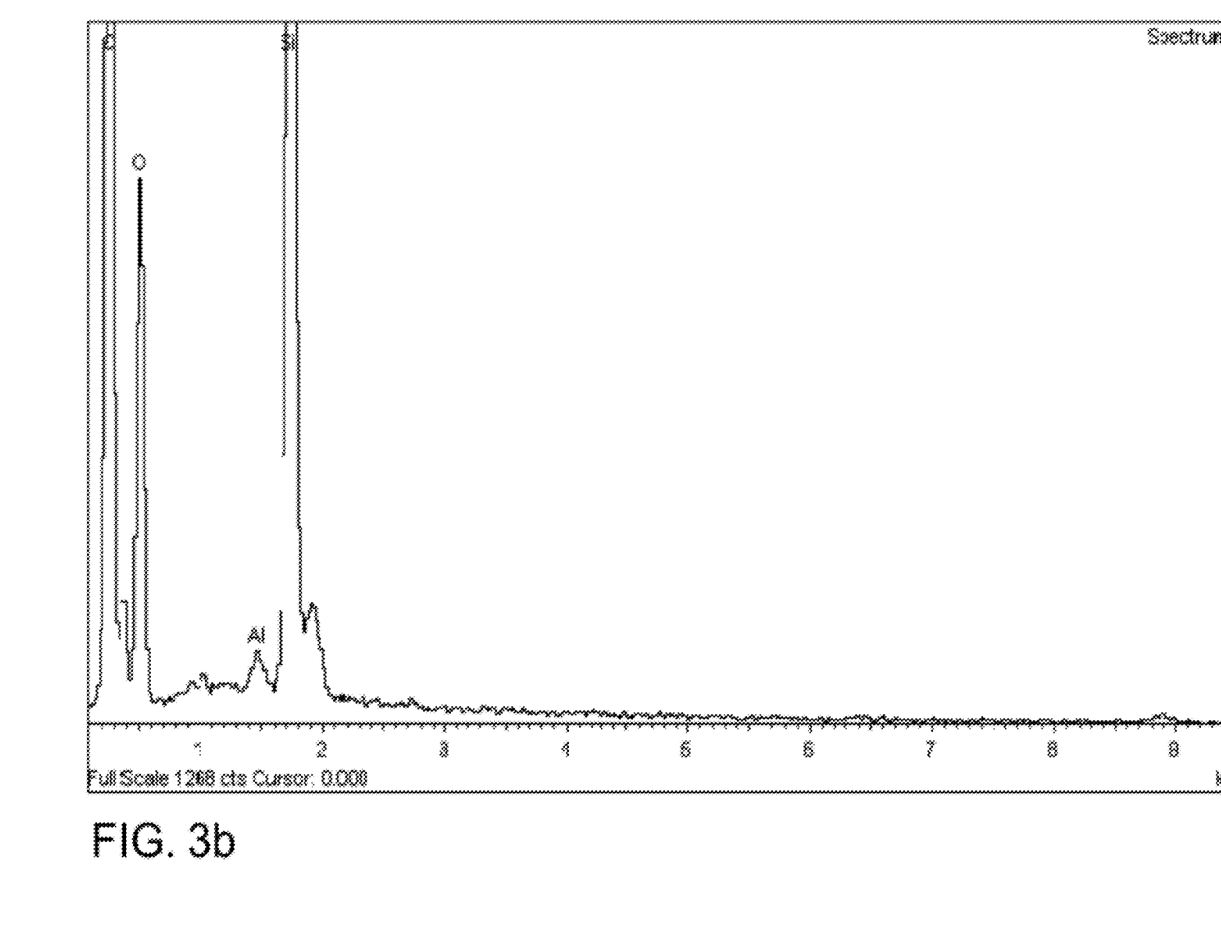
Figure 4A:
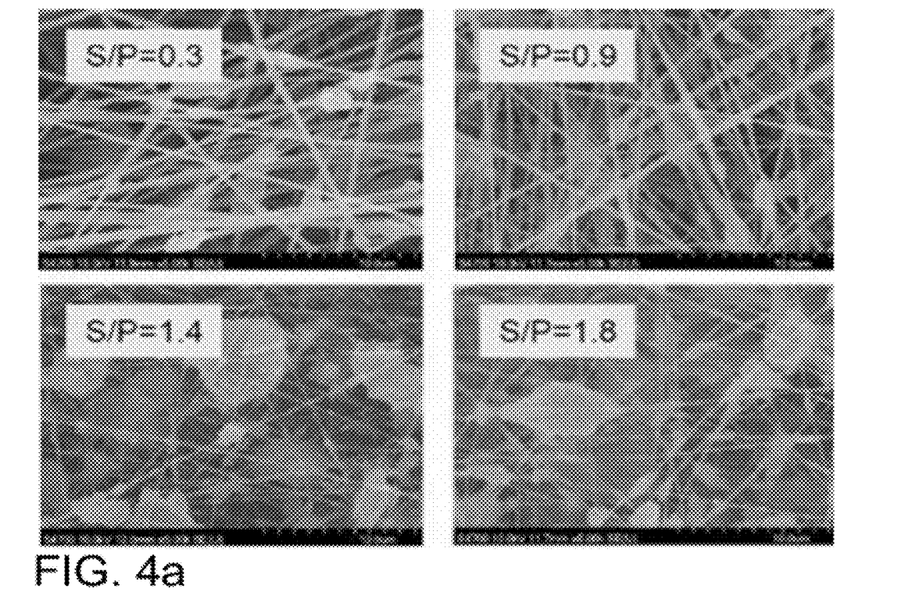
FIGS. 4a to 4d are scanning electron microscope images of sheets produced in Example 2-1.
Figure 4B:
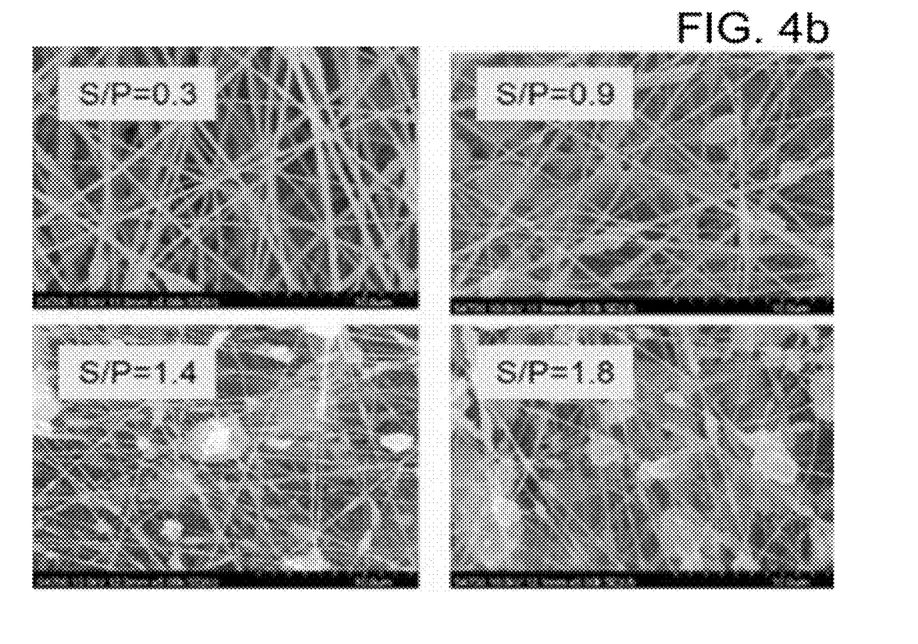
Figure 4C:
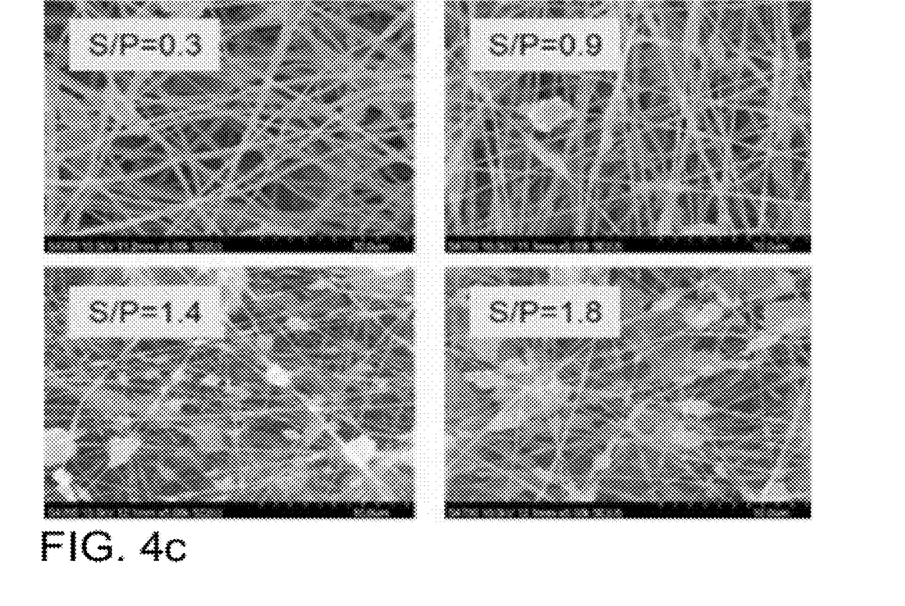
Figure 4D:
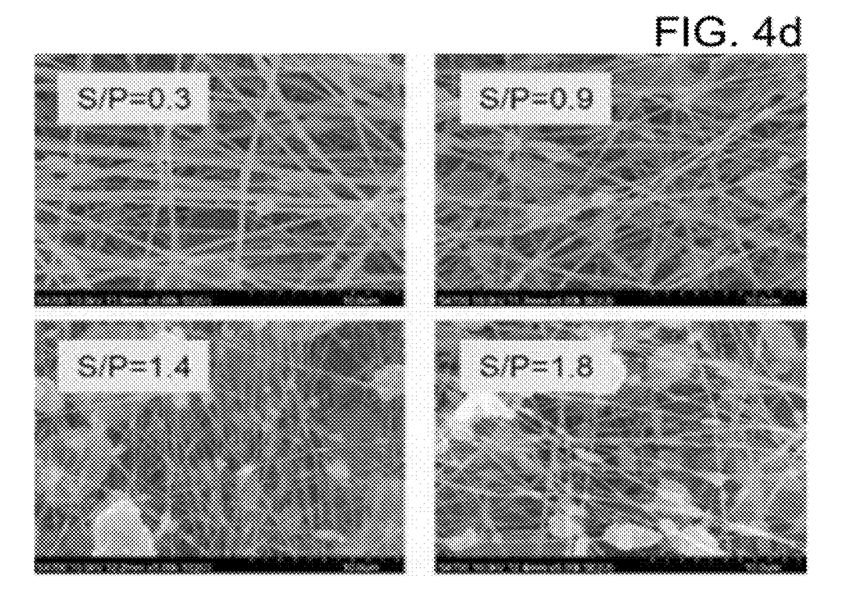

The electrospinning solution was electrospun using a vertical type electrospinning apparatus. In the electrospinning apparatus, the distance between a spinning nozzle and a current collector was fixed to 20 cm, the voltage was set to 40 kV, and the electrospinning solution was supplied at a rate of 65 ml/hr. As a result of the spinning under an electric field, a thin sheet in the form of a fiber web was produced on the surface of the current collector. The spun sheet included a silica aerogel. The sheet was dried at a temperature of 250° C. in air for 2 hr and further dried at 100° C. under a nitrogen atmosphere. The sheet was observed under a scanning electron microscope. The images are shown in FIG. 2. After spinning (a of FIG. 2) and after drying at 250° C. (b of FIG. 2), the sheet was still in the form of a fiber. The fiber and beads (lump portions) were mixed in the sheet. Even after thermal treatment at 1,000° C. under a nitrogen atmosphere (c of FIG. 2), the sheet was still in the form of a fiber. From these results, it could be confirmed that the sheet of Example 2 was very stable even under high-temperature conditions. The constituent components of the fiber portion (FIG. 3a) and the bead portion (FIG. 3b) on a micrograph of the sheet were analyzed by EDAX. As a result of the analysis, Si, C and O were detected. The fiber and bead portions were confirmed to include the silica aerogel, and the sheet was confirmed to include the silica aerogel fiber. For reference, the peaks shown in FIGS. 3a and 3b represent aluminum used as the current collector.

Comparative Example 2

Comparison of Characteristics of Spinning Solutions

A solution of 15.1 g of polyacrylonitrile in 100 ml of N,N-dimethylformamide (DMF) was used as a spinning solution. The characteristics of the electrospinning solution were compared with those of the electrospinning solution prepared in Example 2. The electrospinning solution of Example 2 was more flowable than the electrospinning solution of Comparative Example 2. The electrospinning solution of Example 2 was colored ivory due to the presence of the hydrophobic gel, whereas the electrospinning solution of Comparative Example 2 was transparent to visible light and was more viscous than the electrospinning solution of Example 2.

Example 2-1

Comparison of Characteristics of Sheets Produced by Mixing Polymer (PAN) and Hydrophobic Gel in Different Ratios Sheets were produced in the same manner as in Example 2, except that the mixing ratio of polyacrylonitrile to the hydrophobic gel varied from 30% (S/P=0.3 in FIGS. 4a to 4d) to a maximum of 180% (S/P=1.8 in FIGS. 4a to 4d). 1.1 g of polyacrylonitrile and the hydrophobic gel were mixed with 10 ml of N,N-dimethylformamide to prepare spinning solutions. The hydrophobic gel was used in different amounts (0.3 g, 1 g, 1.5 g and 2 g). The spinning solutions were electrospun to produce sheets. The sheets were dried in air at 100° C., 200° C. and 250° C. Images of the sheet after spinning and the sheets after drying at the different temperatures were taken by scanning electron microscopy and are shown in FIGS. 4a to 4d. The figures demonstrate that the flowability of the solutions increased and the amount of beads increased with increasing amount of the hydrophobic gel.

Example 3

Comparison of Dissolution Characteristics of the Hydrophobic Gel

Figure 5:
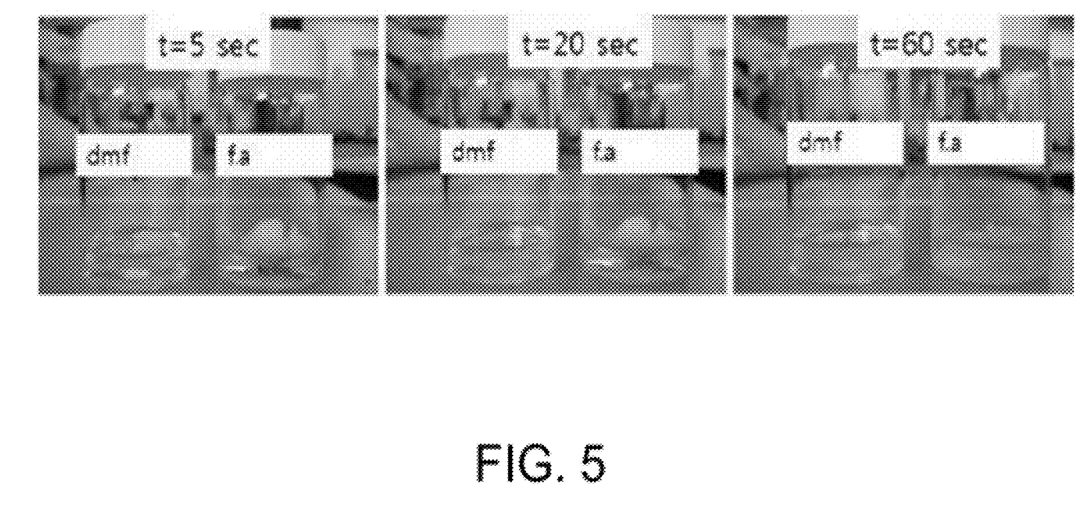
FIG. 5 photographically shows the dissolution characteristics of a hydrophobic gel in formic acid and DMF.

FIG. 5 shows the dissolution characteristics of the hydrophobic gel in formic acid and N,N-dimethylformamide. As can be seen from FIG. 5, the hydrophobic gel was dissolved at a high rate in N,N-dimethylformamide to form a transparent solution, whereas when the hydrophobic gel was dissolved in formic acid, a portion of the aerogel remained in the solution made the solution turbid. Both formic acid and N,N-dimethylformamide are polar solvents having a dielectric constant of 15 or higher, but formic acid belongs to a protic solvent having an O—H or N—H bond like water and N,N-dimethylformamide is an aprotic solvent having no O—H or N—H bond. Protic solvents, typified by water, have the ability to solvate the hydrophobic gel by hydrogen bonding. The gel whose surface was hydrophobically modified has a chemical affinity for N,N-dimethylformamide having methyl groups (—$CH_3$) exposed to the outside. Therefore, N,N-dimethylformamide is more suitable as a solvent for dissolving the hydrophobic gel.

Example 4

The procedure of Example 2 was repeated, except that a hydrochloric acid solution was further used to prepare a hydrophobic wet gel. Specifically, 10 ml of a 1 M hydrochloric acid solution was mixed with 30 ml of a commercial water glass solution. The mixture was mixed with 30 ml of ethanol, which is the same volume as the water glass solution, to prepare a wet gel. The subsequent procedure was the same as in Example 2.

As is apparent from the foregoing, since water glass is used as a raw material instead of an expensive raw material in the method of the present invention, sheets including a high-performance silica aerogel can be produced at reduced cost.

In addition, since ambient drying in air is used instead of supercritical drying in the method of the present invention, there is no need to employ an apparatus specially designed to create critical conditions or more extreme conditions, leading to a reduction in production and installation costs.

Furthermore, the sheet of the present invention includes a polymer and a silica aerogel uniformly distributed in the form of a fiber or in the form of a fiber and a bead. Due to this structure, the sheet of the present invention has a lower thermal conductivity than silica aerogel composites of the prior art. The sheet of the present invention has a greater thickness than prior art fibers produced via electrospinning, thus achieving improved physical properties, for example, high strength. Moreover, the sheet including a silica aerogel in the form of a fiber has a larger contact surface area than bulky silica aerogels, achieving considerably improved adsorptivity and reactivity. Therefore, the sheets of the present invention can be used in applications where adsoptivity is required as well as in applications where excellent thermal insulation effects are required.

The invention claimed is:

1. A method for producing a sheet including a silica aerogel, comprising:
   (S1) gelling a water glass solution in a mixture of an alcohol and water to prepare a wet gel;
   (S2) hydrophobically modifying the surface of the wet gel with a non-polar organic solvent, an organosilane compound and an alcohol;
   (S3) dissolving a hydrophobically modified silica gel and a polymer in an aprotic organic solvent to prepare an electrospinning solution, wherein the hydrophobically modified silica gel and the polymer are mixed in a weight ration of 30:1 to 400:1; and
   (S4) electrospinning the electrospinning solution to produce a fiber web including a silica aerogel.

2. The method according to claim 1, wherein an acid solution is further added to the mixture of an alcohol and water used in step S1.

3. The method according to claim 2, wherein the acid solution comprises one or more acid selected from the group consisting of hydrochloric acid, sulfuric acid, nitric acid and acetic acid.

4. The method according to claim 1, wherein the alcohol used in step S1 and S2 is independently selected from the group consisting of ethanol, methanol, propanol, butanol and a combination thereof.

5. The method according to claim 1, wherein the non-polar organic solvent used in step S2 is a hydrocarbon solvent selected from the group consisting of hexane, heptane, xylene, toluene and cyclohexane.

6. The method according to claim 1, wherein the organisilane compound used in step S2 is one or more selected from the group consisting of trimethylchlorosilane (TMCS), hexamethyldisilazane (HMDS), methyltrimethoxysilane, trimethylethoxysilane, ethyltriethoxy-silane and phenyltriethoxysilane.

7. The method according to claim 1, wherein the polymer used in step S3 is poly(methyl methacrylate), poly(vinylidene fluoride) or poly(acrylonitrile).

8. The method according to claim 1, wherein the aprotic solvent used in step S3 is selected from the group consisting of N,N-dimethylformamide, N-methylpyrrolidone, dimethylacetamide, dimethyl sulfoxide and acetonitrile.

9. The method according to claim 1, wherein the fiber has an average diameter of 1 micron or more.

10. The method according to claim 1, wherein the alcohol and the water glass solution are mixed in a volume ratio of 0.33:1 to 1:1 in step S1.

11. The method according to claim 1, wherein in step S4, the electrospinning is performed at a fixed distance of 10 to 20 cm between a spinning nozzle and a current collector, a set voltage of 10 to 60 kV and a supply rate of 0.5 to 100 ml/hr.

12. The method according to claim 1, wherein the sheet in the form of a fiber web prepared in step S4 further includes beads on the surface of the fiber.

13. The method according to claim 1, wherein the step S4 further includes drying the sheet in the form of a fiber web prepared by electrospinning at a temperature ranging from the boiling point of the solvent to 300° C. in air.

14. The method according to claim 1, further comprising thermally treating the sheet at a temperature of 300 to 1,000° C. after step S4.

* * * * *

UNITED STATES PATENT AND TRADEMARK OFFICE
CERTIFICATE OF CORRECTION

PATENT NO. : 8,647,557 B2  Page 1 of 1
APPLICATION NO. : 13/252552
DATED : February 11, 2014
INVENTOR(S) : Yeo et al.

It is certified that error appears in the above-identified patent and that said Letters Patent is hereby corrected as shown below:

In the Claims

Col 10, Line 20, "ration" should be -- ratio --

Signed and Sealed this
Fourteenth Day of July, 2015

Michelle K. Lee
*Director of the United States Patent and Trademark Office*